June 20, 1939.　　　A. H. FRAZIER　　　2,163,142
CONCEALABLE STAIR
Filed June 10, 1937
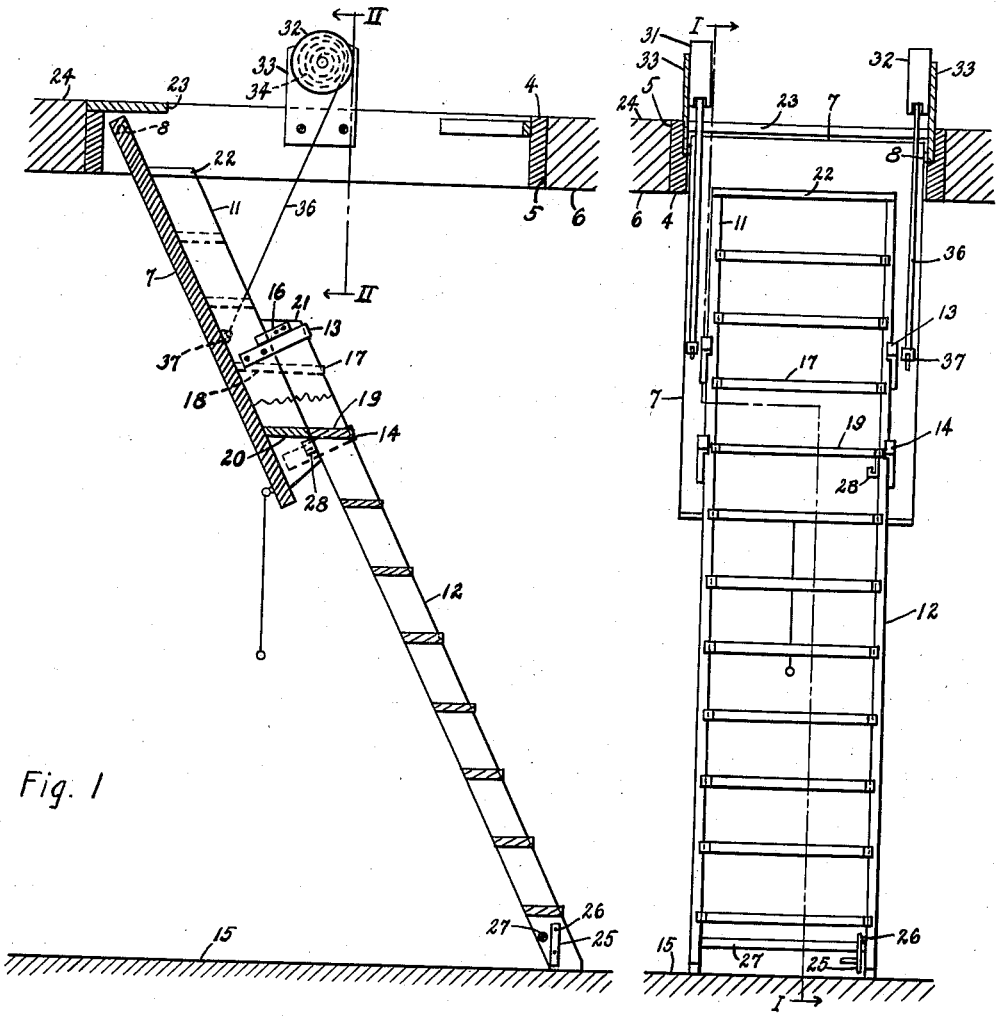
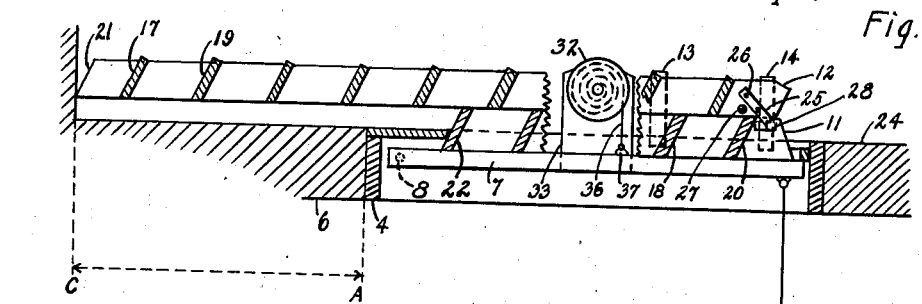
Fig. 1
Fig. 2
Fig. 3
INVENTOR
Aldus H. Frazier
BY O.B.Buchanan
ATTORNEY Patented June 20, 1939

2,163,142

UNITED STATES PATENT OFFICE 2,163,142

CONCEALABLE STAIR

Aldus H. Frazier, Pittsburgh, Pa.

Application June 10, 1937, Serial No. 147,426

3 Claims. (Cl. 228—50)

My invention relates to a concealable or disappearing stair mounted on a swinging trap door in a ceiling, and it has specific relation to an improvement in the concealed stairway of my Patent No. 1,883,777, granted October 18, 1932.

The principal object of my invention is to reduce the clearance-space required, in the attic, for the accommodation of the upper end of the concealed stairway in its closed or concealed position.

A more specific object of the invention is to provide a two-part stair mounted upon a hinged trap door, one part of the stair being fixed to the upper surface of the trap door, and the other part being slidable on the fixed part. In this manner, the top end of the slidable part, which has heretofore had to be long enough to reach to within one step of the attic floor near the hinge of the trap door, may be cut off, because of the presence of the fixed part of the stair, thereby reducing the clearance-space required in the attic to accommodate the upper end of the slidable stair in its concealed position.

With the foregoing and other objects in view, my invention consists in the structures, combinations and parts hereinafter described and claimed, and illustrated in the accompanying drawing, wherein—

Fig. 1 is a vertical sectional side-view of a preferred embodiment of my invention, on the line I—I of Fig. 2, with the stair in its open or operative position, Fig. 2 is a vertical sectional front-view of the same on the line II—II of Fig. 1, and Fig. 3 is a vertical sectional side-view of the stair in its closed or concealed position, with parts broken away to show one of the springs.

My concealable stairway comprises a jamb 4 adapted to be mounted in an opening 5 in a ceiling 6, a trap door 7 hinged at 8, near one end, in the jamb 4, and a two-part stair 11, 12, the stair-part 11 being relatively short, and affixed to the upper surface of the trap door 7, and the stair-part 12 being relatively long, and slidably supported, by brackets 13 and 14, above the upper surface of the fixed stair-part 11, which it overlaps at all times.

In the open or operative position of the stairway, the trap door 7 is swung downwardly in an inclined position, and the slidable stair-part 12 is dropped or pulled out to the limit of its extended position, so that its lower end rests upon the floor 15 below. The extension of the slidable-part 12 is definitely limited by a stop 16, which it carries, engaging against the upper bracket 13, and in this extended position of the stair, at least the top tread 17 of the slidable part 12 is in substantial alinement with a tread 18 of the fixed part 11. In the preferred embodiment, as illustrated, the two top treads 17 and 19 of the slidable stair-part 12 aline with the two bottom treads 18 and 20 of the fixed stair-part 11. The top end 21 of the slidable stair-part 12 is cut off shortly above its top tread 17.

The fixed stair-part 11, which is attached to the trap-door 7, has a plurality of treads in addition to the two bottom treads 18 and 20, including a top tread 22 which is properly spaced with respect to an immovable tread 23 which is carried by the jamb 4 in alinement with the attic floor 24.

When the stairway is to be moved from its operative position to its concealed position, the lower end of the slidable stair-part 12 is lifted off the floor 15, and the slidable stair-part 12 is pushed upwardly until its lower end is within the confines of the trap door 7, in which position it is secured by any suitable means. In the illustrated embodiment of my invention, this securing means is in the form of a swinging latch or catch 25 carried by the slidable stair-part 12, near its lower end. The catch 25 is pivoted at its upper end 26, and when the stair is raised, the catch 25 swings against a handling-rod 27 carried by the slidable stair-part 12, near its lower end, and the lower or free end of the catch 25 engages a hook or projection 28 carried by the fixed stair-part 11, near the lower end of the latter, so as to hold the slidable stair-part 12 in its nested or upper position, as shown in Fig. 3.

To release the catch 25, the trap door 7 is held slightly ajar and the slidable stair-part 12 is pushed back sufficiently to disengage the catch 25 from the hook 28, after which the catch is swung free of the hook and the slidable part 12 is extended to the limit of its lowering movement, as limited by stop 16.

When the stairway is in its elevated concealed position or closed position, as shown in Fig. 3, the movable stair-part, being longer than the stationary part on the trapdoor 7, extends over the attic floor 24, requiring an attic-space represented by the distance A—C in Fig. 3. As described in my previously mentioned Patent 1,883,777, this overhang A—C is useful in counteracting some or all of the weight on the other side of the hinge 8, thus helping to hold the stairway in its elevated concealed position, or altogether so holding it.

It is usually desirable to provide some means for assisting in raising the stair, and often also for holding the trap door 7 in its closed position, shown in Fig. 3. In the illustrated embodiment of my invention, I cause this function to be performed by specially designed or arranged coil springs 31 and 32 (Fig. 2), which are carried by supporting brackets 33 mounted on the sides of the jamb 4 at points removed from the hinge 8 of the trap door. The coil springs 31 and 32 have inner ends 34 which are coiled within a spring-housing, and flexible free ends 36 which are fastened at 37 to the trap door 7 at points removed from the hinge 8. The choice of the mounting positions of the supporting brackets 33 and the fastening means 37 may be such that the springs 36 pull substantially normally or at right angles with respect to the trap door 7 in the retracted position of the spring, that is, when the trap door is closed as shown in Fig. 3, whereas, when the trap door is in its open position shown in Fig. 1, the spring ends 36 may extend at an acute angle with respect to the trap door, thereby reducing the effective pull of the spring by the cosine of the angle.

However, the retractive pull of the springs is greater in their extended position, that is, when the trap door is open, and the amount of this increase in the spring-tension is dependent upon the relation of the distance by which the spring is extended, divided by the effective total length of the spring. These variables, spring-length, extension, and angles, may be suitably varied or adjusted so that the spring gently completes the closing movement of the trap door to prevent excessive banging as the concealable stair approaches its concealed position and gently restrains the opening movement to prevent excessive banging as the lower end of the slidable part of the stair approaches the floor in the operative position of the stair.

From the foregoing description, it will be perceived that I have provided an improved concealable stairway which is easy to operate, is economical to build, and will take a minimum of clearance-space A—C (Fig. 3) in the attic, a popular size requiring a 19-inch A—C clearance, in my present model, as compared with a 73-inch A—C clearance in my old model shown in Patent No. 1,883,777, which did not have the upper, fixed part 11 of my present stair. This represents a very valuable saving of 54 inches in the attic-space necessary to accommodate my new stairway, thereby enormously increasing the applicability of the stairway to houses of all descriptions.

While I have illustrated my invention in a single form of embodiment which is at present preferred, it will be obvious that the invention is susceptible of a wide variety of embodiments, in respect to specific details of construction. I desire, therefore, that my description and drawing shall be regarded as illustrative only, and that the appended claims shall be accorded the broadest interpretation consistent with their language and the prior art.

I claim as my invention:

1. A concealable stairway comprising a jamb adapted to be mounted in an opening in a ceiling, a trap door hinged in said jamb, a two-part stair having a relatively short fixed part affixed to the upper surface of the trap door and having a relatively long slidable part, a pair of brackets on each side of the fixed part for slidably supporting the slidable part upon the upper surface of the fixed part in such manner that the slidable part may be pushed up into a concealed position in the space above the trap door or slid down into an operative position with its lower end resting upon a floor below, the slidable part overhanging the jamb by a substantial amount in the concealed position of the stairway, means for definitely limiting the downward sliding motion of the slidable part so that at least its top tread is in substantial alinement with a tread of the fixed part, the slidable part overlapping a short portion of the fixed part in the operative position of the stair, whereby to limit the clearance-space required for the upper end of the slidable part in the concealed position of the stair, and means for maintaining the slidable part up and the trap door up, in the concealed position of the stair.

2. A concealable stairway comprising a jamb adapted to be mounted in an opening in a ceiling, a trap door hinged in said jamb, a two-part stair having a relatively short fixed part affixed to the upper surface of the trap door and having a relatively long slidable part, a pair of brackets on each side of the fixed part for slidably supporting the slidable part upon the upper surface of the fixed part in such manner that the slidable part may be pushed up into a concealed position in the space above the trap door or slid down into an operative position with its lower end resting upon a floor below, the slidable part overhanging the jamb by a substantial amount in the concealed position of the stairway, means for definitely limiting the downward sliding motion of the slidable part so that at least its top tread is in substantial alinement with a tread of the fixed part, the slidable part overlapping a short portion of the fixed part in the operative position of the stair, whereby to limit the clearance-space required for the upper end of the slidable part in the concealed position of the stair, said short portion of overlap, in the operative position of the stair, being at least as great as the distance between two treads, and means for maintaining the slidable part up and the trap door up, in the concealed position of the stair.

3. A concealable stairway comprising a jamb adapted to be mounted in an opening in a ceiling, a trap door hinged in said jamb, a two-part stair having a relatively short fixed part affixed to the upper surface of the trap door and having a relatively long slidable part, a pair of brackets on each side of the fixed part for slidably supporting the slidable part upon the upper surface of the fixed part in such manner that the slidable part may be pushed up into a concealed position in the space above the trap door or slid down into an operative position with its lower end resting upon a floor below, the slidable part overhanging the jamb by a distance at least of the order of 19 inches in the concealed position of the stairway, means for definitely limiting the downward sliding motion of the slidable part so that at least its top tread is in substantial alinement with a tread of the fixed part, the slidable part overlapping a short portion of the fixed part in the operative position of the stair, whereby to limit the clearance-space required for the upper end of the slidable part in the concealed position of the stair, and means for maintaining the slidable part up and the trap door up, in the concealed position of the stair.

ALDUS H. FRAZIER.